United States Patent
Li et al.

(10) Patent No.: US 9,386,353 B2
(45) Date of Patent: Jul. 5, 2016

(54) CHILD NODE, PARENT NODE, AND CACHING METHOD AND SYSTEM FOR MULTI-LAYER VIDEO NETWORK

(71) Applicant: Huawei Technologies Co., Ltd., Shenzhen (CN)

(72) Inventors: Bo Li, Guangdong (CN); Yijun Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 340 days.

(21) Appl. No.: 14/143,113

(22) Filed: Dec. 30, 2013

(65) Prior Publication Data

US 2014/0215543 A1 Jul. 31, 2014

Related U.S. Application Data

(63) Continuation of application No. PCT/CN2013/080996, filed on Aug. 7, 2013.

(30) Foreign Application Priority Data

Jan. 25, 2013 (CN) .......................... 2013 1 0030160

(51) Int. Cl.
*H04N 21/63* (2011.01)
*H04N 21/2183* (2011.01)
(Continued)

(52) U.S. Cl.
CPC ..... *H04N 21/64738* (2013.01); *H04N 21/2183* (2013.01); *H04N 21/2225* (2013.01); *H04N 21/23106* (2013.01); *H04N 21/63* (2013.01)

(58) Field of Classification Search
CPC .............. H04N 21/63; H04N 21/2183; H04N 21/64738; H04N 21/23106; H04N 21/2225
See application file for complete search history.

(56) References Cited

U.S. PATENT DOCUMENTS 6,167,438 A * 12/2000 Yates ................ G06F 17/30902
707/E17.12
8,537,835 B2 9/2013 Saniee
(Continued)

FOREIGN PATENT DOCUMENTS

| CN | 102067617 A | 5/2011 |
|---|---|---|
| EP | 2515478 A1 | 10/2012 |
| WO | 9853410 A2 | 11/1998 |

OTHER PUBLICATIONS

Foreign Communication From A Counterpart Application, PCT Application No. PCT/CN2013/080996, Chinese Search Report dated Nov. 14, 2013, 6 pages.

(Continued)

*Primary Examiner* — Pinkal R Chokshi
(74) *Attorney, Agent, or Firm* — Conley Rose, P.C.; Grant Rodolph; Nicholas K. Beaulieu

(57) ABSTRACT

The present invention discloses a child node, a parent node, and a caching method and system for a multi-layer video network. The multi-layer video network includes at least one parent node and multiple child nodes connected to the parent node. The method includes: collecting a user request arrival rate of each child node with respect to each content in a content set; and determining an optimal storage policy and an optimal upload bandwidth allocation policy of each child node with respect to each content based on the user request arrival rate, storage capacity and upload bandwidth of each child node, and a size of each content. According to the content disclosed above, the technical solution disclosed by the present invention can save network bandwidth as much as possible and implement coordination among cache nodes, and is compatible with a heterogeneous network resource environment.

8 Claims, 5 Drawing Sheets

(51) Int. Cl.
*H04N 21/647* (2011.01)
*H04N 21/2225* (2011.01)
*H04N 21/231* (2011.01)

(56) References Cited

U.S. PATENT DOCUMENTS

| | | | |
|---|---|---|---|
| 9,241,180 B2* | 1/2016 | Bugenhagen | G06Q 30/02 |
| 2008/0092181 A1* | 4/2008 | Britt | H04N 7/1675 725/87 |
| 2008/0320011 A1* | 12/2008 | Crockett | G06F 17/30091 |
| 2009/0316715 A1 | 12/2009 | Saniee | |
| 2011/0122137 A1 | 5/2011 | Wang et al. | |

OTHER PUBLICATIONS

Foreign Communication From A Counterpart Application, PCT Application No. PCT/CN2013/080996, Chinese Written Opinion dated Nov. 14, 2013, 6 pages.
Qian, B., et al., "OXVoD: A Video-on-Demand System Based on P2P Delamination Structure," Computer Engineering and Applications, vol. 46, No. 7, 2010, pp. 203-207.
Do, T.T., et al., "P2VoD: Providing Fault Tolerant Video-on-Demand Streaming in Peer-to-Peer Environment," IEEE International Conference on Communications, vol. 3, Jun. 20-24, 2004, pp. 1467-1472.
Li, K., et al., "Optimal Method for Coordinated Enroute Web Caching for Tree Networks," ACM Transactions on Internet Technology, vol. 6, No. 3, Aug. 2005, pp. 480-507.
Borst, S., et al., "Distributed Caching Algorithms for Content Distribution Network," Department of Computer Science, Proceedings IEEE INFOCOM, Mar. 14-19, 2010, 9 pages.
Wenzhong, L., et al., "Analysis and Performance Study for Coordinated Hierarchical Cache Placement Strategies," Computer Communications 33, Aug. 31, 2009, pp. 1834-1842.
Baev, I, et al., "Approximation Algorithms for Data Placement Problems," SIAM Journal on Computing, vol. 38, No. 4, Jul. 2008, 18 pages.
Dai, J, et al., "Collaborative Hierarchical Caching with Dynamic Request Routing for Massive Content Distribution," Hong Kong University of Science and Technology, Jan. 2012, 9 pages.
Alan, T.S., IP, et al., "COPACC: An Architecture of Cooperative Proxy-Client Caching System for On-Demand Media Streaming," IEEE Transactions on Parallel and Distributed Systems, vol. 18, No. 1, Jan. 2007, pp. 70-83.
Foreign Communication From a Counterpart Application, European Application No. 13789150.3, Extended European Search Report dated Feb. 20, 2015, 8 pages.

* cited by examiner

CHILD NODE, PARENT NODE, AND CACHING METHOD AND SYSTEM FOR MULTI-LAYER VIDEO NETWORK

CROSS-REFERENCE TO RELATED APPLICATIONS

This application is a continuation of International Application No. PCT/CN2013/080996, filed on Aug. 7, 2013, which claims priority to Chinese Patent Application No. 201310030160.6, filed on Jan. 25, 2013, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of network communications technologies, and in particular, to a child node, a parent node, and a caching method and system for a multi-layer video network.

BACKGROUND

With the rapid development of computer network technologies and infrastructure construction, multimedia network services provided by multimedia service providers, for example, high-resolution video-on-demand services, are growing gradually. These services generally use bandwidth and storage resources in a caching system to provide a high-quality and uninterruptible video stream to an end user. However, the ever-increasing number of users as well as higher and higher requirements on service quality also imposes much pressure on the service providers. The overall bandwidth and storage resources of a video-on-demand system are limited. As a result, the service providers have to increase investment on infrastructure construction, so as to satisfy user's increasing requirements. In such a context, how to efficiently use the bandwidth resources and storage resources of the caching system to satisfy user's requirements in a better way becomes a problem requiring serious consideration. However, when the problem is considered for a caching system in a distributed environment, heterogeneity of system resources and user access behaviors makes a more complex policy for the caching system, where it is difficult to implement high-efficiency coordination among nodes. As a result, how to use an existing infrastructure architecture to implement coordination among cache nodes as much as possible in a heterogeneous network environment to satisfy user's requirements on services is a major content of study in the distributed field.

In an existing layered caching system, a user request is transferred in an upstream path in a multi-layer video network. The request is satisfied once a related content is stored on a server. Meanwhile, the system generally determines a caching policy by using a minimum packet path length as an optimization target. Firstly, an overall topology structure of the system, storage capacity information of nodes, and user access modes are obtained; then, a caching policy problem is formulated into an optimization problem. An optimization target is used to minimize an access path length of a request. However, this conventional policy has several serious defects. Firstly, static request routing can implement caching coordination only between different layers, but can hardly implement caching coordination between nodes at the same layer, which affects resource sharing among distributed cache servers. Secondly, a video system consumes much network bandwidth at present, and the optimization target using only the request packet path length does not comply with actual requirements of the system. Thirdly, in order to simplify the problem, a conventional optimized caching policy generally assumes that there is a homogeneous system resource configuration, which does not comply with the actual condition of the system.

In the prior art, a distributed caching method for an Internet Protocol Television (IPTV) system is further proposed. This method raises a problem of using a minimized content transmission cost as a target. In subsequent system verification, the content transmission cost is measured by using a basic criterion of a transmission distance from a source node returning a content to a user. This method assumes that a system has limited resources and is homogeneous on the whole, that is, nodes at the same layer have the same storage capacity, and user requests on the nodes have the same structure. On this basis, the method proposes a distributed caching policy as follows:

1. a content attracting the highest attention is stored on all bottom-layer nodes;
2. a content attracting higher attention is stored only on partial bottom-layer nodes; and
3. other contents attracting relatively low attention is stored only on a certain bottom-layer node.

This method further simplifies the policy into a greedy method based on content utility. A content attracting relatively high attention has a relatively high degree of utility, and a content attracting relatively low attention has a relatively low degree of utility in cases where it is stored by another node.

The method in the prior art has the defect that the method assumes that the overall system resources are homogeneous. However, in an actual large-scale video system, generally servers are heterogeneous in terms of capacity, and content requests of users in different areas usually have different modes. This method fails to reflect the bandwidth consumption feature in the existing video system. In caching policy designing for a high-definition video system, instead of using only the path length as a criterion for measuring system performance, the problem of limited bandwidth resources also needs to be considered.

SUMMARY

The main technical problem to be solved by the present application is to provide a caching method and system implementation manner for a multi-layer video network, which can save network bandwidth as much as possible and implement coordination among cache nodes, and is compatible with a heterogeneous network resource environment.

In a first aspect, a caching method for a multi-layer video network is provided, where the multi-layer video network includes at least one parent node and multiple child nodes connected to the parent node, and the method includes: collecting a user request arrival rate of each child node with respect to each content in a content set; and determining an optimal storage policy and an optimal upload bandwidth allocation policy of each child node with respect to each content based on the user request arrival rate, storage capacity and upload bandwidth of each child node, and a size of each content.

With reference to the implementation manner of the first aspect, in a first possible implementation manner, the step of determining the optimal storage policy and the optimal upload bandwidth allocation policy of each child node with respect to each content based on the user request arrival rate, the storage capacity and the upload bandwidth of each child node, and the size of each content includes: calculating, by each child node, a current storage policy of each child node with respect to each content by using the user request arrival rate and the storage capacity of each child node, the size of each content, and an iteration coefficient with respect to each content, and sending the current storage policy to the parent node; calculating, by the parent node, a current total content demand according to the current storage policy of the multiple child nodes, the user request arrival rate, and the size of each content, and transferring the current total content demand to each child node; calculating, by each child node, an upload bandwidth allocation policy according to the current total content demand and the upload bandwidth of each child node, and transferring the upload bandwidth allocation policy to the parent node; and updating, by the parent node, the iteration coefficient according to the upload bandwidth allocation policy, the upload bandwidth, and the current total content demand, and returning to the step of determining the current storage policy until the current storage policy and the upload bandwidth allocation policy converge at the optimal storage policy and the optimal upload bandwidth allocation policy.

With reference to the first possible implementation manner of the first aspect, in a second possible implementation manner, the step of calculating, by each child node, the current storage policy of each child node with respect to each content by using the user request arrival rate, the storage capacity, the size of each content, and the iteration coefficient with respect to each content includes: defining the current storage policy as follows in each child node:

$$X_{ij}^k(t) = \begin{cases} 1, & \text{for } k \in [1, z); \\ 0, & \text{for } k \in [z, |K|], \end{cases}$$

where $X_{ij}^k(t)$ is the current storage policy; z=min{h: $\Sigma_{k=1}^h s_k > B_{ij}$}; K is a content set; k is each content in the content set K; $s_k$ is a size of each content k; $B_{ij}$ is storage capacity; i and j are non-zero positive integers; h is a positive number; when $X_{ij}^k(t)=1$, the child node stores the content k; when $X_{ij}^k(t)=0$, the child node does not store the content k; and t is the number of iterations of the iteration coefficient.

With reference to the first possible implementation manner of the first aspect, in a third possible implementation manner, the step of calculating, by the parent node, the current total content demand according to the current storage policy of the multiple child nodes, the user request arrival rate, and the size of each content includes: obtaining the current total content demand according to the following equation:

$$Q_k(t) = \sum_{j \in J} \lambda_{ij}^k s_k (1 - X_{ij}^k(t)),$$

where $Q_k(t)$ is the current total content demand; $X_{ij}^k(t)$ is the current storage policy; $\lambda_{ij}^k$ is the user request arrival rate; K is a content set; k is each content in the content set K; $s_k$ is a size of each content k; i, j, and J are non-zero positive integers; and t is the number of iterations of the iteration coefficient.

With reference to the first possible implementation manner of the first aspect, in a fourth possible implementation manner, the step of calculating, by each child node, the upload bandwidth allocation policy according to the current total content demand and the upload bandwidth of each child node includes: calculating the upload bandwidth allocation policy according to the following equation:

$$q_{ij}^k(t) = \begin{cases} \dfrac{Q_k(t)}{U_{ji}} & k \in [1, z) \text{ and } X_{ij}^k(t) = 1; \\ \dfrac{U_{ji} - \sum_{k=1}^{z-1} Q_k(t)}{U_{ji}} & k = z; \\ 0 & k \in (z, |K|] \text{ or } X_{ij}^k(t) = 0, \end{cases}$$

where $q_{ij}^k(t)$ is the upload bandwidth allocation policy; $Q_k(t)$ is the current total content demand; $X_{ij}^k(t)$ is the current storage policy; $\lambda_{ij}^k$ is the user request arrival rate; $U_{ji}$ is the upload bandwidth of each child node; z=min{h:$\Sigma_{k=1}^h s_k > B_{ij}$}; K is a content set; k is each content in the content set K; $s_k$ is a size of each content k; $B_{ij}$ is the storage capacity of each child node; i and j are non-zero positive integers; h is a positive integer; and t is the number of iterations of the iteration coefficient.

With reference to the first possible implementation manner of the first aspect, in a fifth possible implementation manner, the step of updating, by the parent node, the iteration coefficient according to the upload bandwidth allocation policy, the upload bandwidth, and the current total content demand includes: updating the iteration coefficient according to the following equation:

$$\eta_{ij}^k(t+1) = \eta_{ij}^k(t) + \theta(t)\left(\sum_{j \in J} q_{ij}^k(t) U_{ji} - Q_k(t)\right) * f\left(\sum_{k \in K} q_{ij}^k(t)\right),$$

where $\eta_{ij}^k(t+1)$ is the iteration coefficient after the updating; $\eta_{ij}^k(t)$ is the iteration coefficient before the updating; $U_{ji}$ is the upload bandwidth of each child node; $Q_k(t)$ is the current total content demand; $X_{ij}^k(t)$ is the current storage policy; $\lambda_{ij}^k$ is the user request arrival rate; K is a content set; k is each content in the content set K; $s_k$ is a size of each content k; i and j are non-zero positive integers; a function $$f\left(\sum_{k \in K} q_{ij}^k(t)\right)$$

is a function positively related to (1-$\Sigma_{k \in K} q_{ij}^k$; $\theta(t)=1/t$ is a step length in an iteration process; and t is the number of iterations of the iteration coefficient.

In a second aspect, a caching system for a multi-layer video network is provided, where the multi-layer video network includes at least one parent node and multiple child nodes connected to the parent node, and the system includes: a collecting unit configured to collect a user request arrival rate of each child node with respect to each content in a content set; and a policy determining unit configured to determine an optimal storage policy and an optimal upload bandwidth allocation policy of each child node with respect to each content based on the user request arrival rate, storage capacity and upload bandwidth of each child node, and a size of each content.

With reference to the implementation manner of the second aspect, in a first possible implementation manner, the policy determining unit includes: a current storage policy obtaining unit set in each child node configured to calculate a current storage policy of each child node with respect to each content by using the user request arrival rate in each child node, the storage capacity, the size of each content, and an iteration coefficient with respect to each content, and send the current storage policy to the parent node; a current total content demand obtaining unit set in the parent node configured to calculate a current total content demand according to the current storage policy of the multiple child nodes, the user request arrival rate, and the size of each content, and transfer the current content demand to each child node; an upload bandwidth allocation policy obtaining unit set in each child node configured to calculate the upload bandwidth allocation policy according to the current total content demand and the upload bandwidth of each child node, and transfer the upload bandwidth allocation policy to the parent node; and an iteration coefficient updating unit set in the parent node configured to update the iteration coefficient according to the upload bandwidth allocation policy, the upload bandwidth, and the current total content demand, and return the updated iteration coefficient to the current storage policy obtaining unit until the current storage policy obtaining unit determines that the current storage policy and the upload bandwidth allocation policy converge at the optimal storage policy and the optimal upload bandwidth allocation policy.

With reference to the first possible implementation manner of the second aspect, in a second possible implementation manner, the current storage policy obtaining unit is configured to define the current storage policy as follows in each child node:

$$X_{ij}^k(t) = \begin{cases} 1, & \text{for } k \in [1, z); \\ 0, & \text{for } k \in [z, |K|], \end{cases}$$

where $X_{ij}^k(t)$ is the current storage policy; $z=\min\{h: \Sigma_{k=1}^h s_k > B_{ij}\}$; K is a content set; k is each content in the content set K; $s_k$ is a size of each content k; $B_{ij}$ is storage capacity; i and j are non-zero positive integers; h is a positive number; when $X_{ij}^k(t)=1$, the content k is stored; when $X_{ij}^k(t)=0$, the content k is not stored; and t is the number of iterations of the iteration coefficient.

With reference to the first possible implementation manner of the second aspect, in a third possible implementation manner, the current total content demand obtaining unit is configured to obtain the current total content demand according to the following equation:

$$Q_k(t) = \sum_{j \in J} \lambda_{ij}^k s_k (1 - X_{ij}^k(t)),$$

where $Q_k(t)$ is the current total content demand; $X_{ij}^k(t)$ is the current storage policy; $\lambda_{ij}^k$ is the user request arrival rate; K is a content set; k is each content in the content set K; $s_k$ is a size of each content k; i, j, and J are non-zero positive integers; and t is the number of iterations of the iteration coefficient.

With reference to the first possible implementation manner of the second aspect, in a fourth possible implementation manner, the upload bandwidth allocation policy obtaining unit is configured to calculate the upload bandwidth allocation policy according to the following equation:

$$q_{ij}^k(t) = \begin{cases} \dfrac{Q_k(t)}{U_{ji}} & k \in [1, z) \text{ and } X_{ij}^k(t) = 1; \\ \dfrac{U_{ji} - \sum_{k=1}^{z-1} Q_k(t)}{U_{ji}} & k = z; \\ 0 & k \in (z, |K|] \text{ or } X_{ij}^k(t) = 0, \end{cases}$$

where $q_{ij}^k(t)$ is the upload bandwidth allocation policy; $Q_k(t)$ is the current total content demand; $X_{ij}^k(t)$ is the current storage policy; $\lambda_{ij}^k$ is the user request arrival rate; $U_{ji}$ is the upload bandwidth of each child node; $z=\min\{h: \Sigma_{k=1}^h s_k > B_{ij}\}$; K is a content set; k is each content in the content set K; $s_k$ is a size of each content k; $B_{ij}$ is the storage capacity of each child node; i and j are non-zero positive integers; h is a positive integer; and t is the number of iterations of the iteration coefficient.

With reference to the first possible implementation manner of the second aspect, in a fifth possible implementation manner, the iteration coefficient updating unit is configured to update the iteration coefficient according to the following equation:

$$\eta_{ij}^k(t+1) = \eta_{ij}^k(t) + \theta(t)\left(\sum_{j \in J} q_{ij}^k(t) U_{ji} - Q_k(t)\right) * f\left(\sum_{k \in K} q_{ij}^k(t)\right),$$

where $\eta_{ij}^k(t+1)$ is the iteration coefficient after the updating; $\eta_{ij}^k(t)$ is the iteration coefficient before the updating; $U_{ji}$ is the upload bandwidth of each child node; $Q_k(t)$ is the current total content demand; $X_{ij}^k(t)$ is the current storage policy; $\lambda_{ij}^k$ is the user request arrival rate; K is a content set; k is each content in the content set K; $s_k$ is a size of each content k; i and j are non-zero positive integers; a function $$f\left(\sum_{k \in K} q_{ij}^k(t)\right)$$

is a function positively related to $(1-\Sigma_{k \in K} q_{ij}^k(t))$; $\theta(t)=1/t$ is a step length in an iteration process; and t is the number of iterations of the iteration coefficient.

In a third aspect, a child node is provided, including: a collecting unit configured to collect a user request arrival rate of a child node with respect to each content in a content set; and a current storage policy obtaining unit configured to calculate a current storage policy of each child node with respect to each content by using the user request arrival rate in the child node, the storage capacity, the size of each content, and an iteration coefficient with respect to each content, and send the current storage policy to the parent node; an upload bandwidth allocation policy obtaining unit configured to calculate an upload bandwidth allocation policy according to a current total content demand obtained from the parent node and upload bandwidth of each child node, and transfer the upload bandwidth allocation policy to the parent node.

With reference to the implementation manner of the third aspect, in a first possible implementation manner, the current storage policy obtaining unit is configured to define the current storage policy as follows in the child node:

$$X_{ij}^k(t) = \begin{cases} 1, & \text{for } k \in [1, z); \\ 0, & \text{for } k \in [z, |K|], \end{cases}$$

where $X_{ij}^k(t)$ is the current storage policy; $z=\min\{h: \Sigma k=1^h s_k > B_{ij}\}$; K is a content set; k is each content in the content set K; $s_k$ is a size of each content k; $B_{ij}$ is storage capacity; i and j are non-zero positive integers; h is a positive number; when $X_{ij}^k(t)=1$, the content k is stored; when $X_{ij}^k(t)=0$, the content k is not stored; and t is the number of iterations of the iteration coefficient.

With reference to the implementation manner of the third aspect, in a second possible implementation manner, the upload bandwidth allocation policy obtaining unit is configured to calculate the upload bandwidth allocation policy according to the following equation:

$$q_{ij}^k(t) = \begin{cases} \dfrac{Q_k(t)}{U_{ji}} & k \in [1, z) \text{ and } X_{ij}^k(t) = 1; \\ \dfrac{U_{ji} - \sum_{k=1}^{z-1} Q_k(t)}{U_{ji}} & k = z; \\ 0 & k \in (z, |K|] \text{ or } X_{ij}^k(t) = 0, \end{cases}$$

where $q_{ij}^k(t)$ is the upload bandwidth allocation policy; $Q_k(t)$ is the current total content demand; $X_{ij}^k(t)$ is the current storage policy; $\lambda_{ij}^k$ is the user request arrival rate; $U_{ji}$ is the upload bandwidth of the child node; $z=\min\{h:\Sigma_{k=1}^h s_k > B_{ij}\}$; K is a content set; k is each content in the content set K; $s_k$ is a size of each content k; $B_{ij}$ is the storage capacity of the child node; i and j are non-zero positive integers; h is a positive integer; and t is the number of iterations of the iteration coefficient.

In a fourth aspect, a parent node is provided, including: a current total content demand obtaining unit configured to calculate a current total content demand according to current storage policies obtained respectively from multiple child nodes, a user request arrival rate, and a size of each content, and transfer the current content demand to each child node; and an iteration coefficient updating unit configured to update an iteration coefficient according to upload bandwidth allocation policies obtained respectively from the multiple child nodes, upload bandwidth, and the current total content demand, and return the updated iteration coefficient to each child node until each child node determines that the current storage policy and the upload bandwidth allocation policy converge at an optimal storage policy and an optimal upload bandwidth allocation policy.

With reference to the implementation manner of the fourth aspect, in a first possible implementation manner, the current total content demand obtaining unit is configured to obtain the current total content demand according to the following equation:

$$Q_k(t) = \sum_{j \in J} \lambda_{ij}^k s_k (1 - X_{ij}^k(t)),$$

where $Q_k(t)$ is the current total content demand; $X_{ij}^k(t)$ is the current storage policy; $\lambda_{ij}^k$ is the user request arrival rate; K is a content set; k is each content in the content set K; $s_k$ is a size of each content k; i, j, and J are non-zero positive integers; and t is the number of iterations of the iteration coefficient.

With reference to the implementation manner of the fourth aspect, in a second possible implementation manner, the iteration coefficient updating unit is configured to update the iteration coefficient according to the following equation:

$$\eta_{ij}^k(t+1) = \eta_{ij}^k(t) + \theta(t)\left(\sum_{j \in J} q_{ij}^k(t) U_{ji} - Q_k(t)\right) * f\left(\sum_{k \in K} q_{ij}^k(t)\right),$$

where $\eta_{ij}^k(t+1)$ is the iteration coefficient after the updating; $\eta_{ij}^k(t)$ is the iteration coefficient before the updating; $U_{ji}$ is the upload bandwidth of each child node; $Q_k(t)$ is the current total content demand; $X_{ij}^k(t)$ is the current storage policy; $\lambda_{ij}^k$ is the user request arrival rate; K is a content set; k is each content in the content set K; $s_k$ is a size of each content k; i and j are non-zero positive integers; a function $$f\left(\sum_{k \in K} q_{ij}^k(t)\right)$$

is a function positively related to $(1-\Sigma_{k \in K} q_{ij}^k(t))$; $\theta(t)=1/t$ is a step length in an iteration process; and t is the number of iterations of the iteration coefficient.

In a fifth aspect, a child node is provided, including a processor, a program memory, a network adapter, and a bus, where the processor, the program memory, and the network adapter are coupled by using the bus, and the program memory stores: a first instruction for controlling the network adapter to collect a user request arrival rate of the child node with respect to each content in a content set; a second instruction for calculating a current storage policy of each child node with respect to each content by using the user request arrival rate in the child node, storage capacity, a size of each content, and an iteration coefficient with respect to each content; a third instruction for controlling the network adapter to send the current storage policy to the parent node; a fourth instruction for controlling the network adapter to calculate an upload bandwidth allocation policy according to a current total content demand obtained from the parent node and upload bandwidth of each child node, and transfer the upload bandwidth allocation policy to the parent node; a fifth instruction for calculating the upload bandwidth allocation policy according to the current total content demand and the upload bandwidth of each child node; and a sixth instruction for controlling the network adapter to transfer the upload bandwidth allocation policy to the parent node; where the processor executes the first instruction, the second instruction, the third instruction, the fourth instruction, the fifth instruction, and the sixth instruction.

In a first possible implementation manner of the fifth aspect, in the second instruction, the current storage policy is defined as follows:

$$X_{ij}^k(t) = \begin{cases} 1, & \text{for } k \in [1, z); \\ 0, & \text{for } k \in [z|K|], \end{cases}$$

where $X_{ij}^k(t)$ is the current storage policy; $z=\min\{h: \Sigma_{k=1}^h s_k > B_{ij}\}$; K is a content set; k is each content in the content set K; $s_k$ is a size of each content k; $B_{ij}$ is storage capacity; i and j are non-zero positive integers; h is a positive number; when $X_{ij}^k(t)=1$, the content k is stored; when $X_{ij}^k(t)=0$, the content k is not stored; and t is the number of iterations of the iteration coefficient.

In a second implementation manner of the fifth aspect, in the fifth instruction, the upload bandwidth allocation policy is calculated according to the following equation:

$$q_{ij}^k(t) = \begin{cases} \dfrac{Q_k(t)}{U_{ji}} & k \in [1, z) \text{ and } X_{ij}^k(t) = 1; \\ \dfrac{U_{ji} - \sum_{k=1}^{z-1} Q_k(t)}{U_{ji}} & k = z; \\ 0 & k \in (z|K|] \text{ or } X_{ij}^k(t) = 0, \end{cases}$$

where $q_{ij}^k(t)$ is the upload bandwidth allocation policy; $Q_k(t)$ is the current total content demand; $X_{ij}^k(t)$ is the current storage policy; $\lambda_{ij}^k$ is the user request arrival rate; $U_{ji}$ is the upload bandwidth of the child node; $z=\min\{h:\Sigma_{k=1}^h s_k > B_{ij}\}$; K is a content set; k is each content in the content set K; $s_k$ is a size of each content k; $B_{ij}$ is the storage capacity of the child node; i and j are non-zero positive integers; h is a positive integer; and t is the number of iterations of the iteration coefficient.

In a sixth aspect, a parent node is provided, including a processor, a program memory, a network adapter, and a bus, where the processor, the program memory, and the network adapter are coupled by using the bus, and the program memory stores: a seventh instruction for calculating a current total content demand according to current storage policies obtained respectively from multiple child nodes, a user request arrival rate, and a size of each content; an eighth instruction for controlling the network adapter to transfer the current content demand to each child node; a ninth instruction for updating an iteration coefficient according to upload bandwidth allocation policies obtained respectively from multiple child nodes, upload bandwidth, and the current total content demand; and a tenth instruction for controlling the network adapter to return the updated iteration coefficient to each child node until each child node determines that the current storage policy and the upload bandwidth allocation policy converge at an optimal storage policy and an optimal upload bandwidth allocation policy; where the processor is configured to execute the seventh instruction, the eighth instruction, the ninth instruction, and the tenth instruction.

In a first implementation manner of the sixth aspect, in the seventh instruction, the current total content demand is obtained according to the following equation:

$$Q_k(t) = \sum_{j \in J} \lambda_{ij}^k s_k (1 - X_{ij}^k(t)),$$

where $Q_k(t)$ is the current total content demand; $X_{ij}^k(t)$ is the current storage policy; $\lambda_{ij}^k$ is the user request arrival rate; K is a content set; k is each content in the content set K; $s_k$ is a size of each content k; i, j, and J are non-zero positive integers; and t is the number of iterations of the iteration coefficient.

In a second implementation manner of the sixth aspect, in the tenth instruction, the iteration coefficient is updated according to the following equation:

$$\eta_{ij}^k(t+1) = \eta_{ij}^k(t) + \theta(t)\left(\sum_{j \in J} q_{ij}^k(t) U_{ji} - Q_k(t)\right) * f\left(\sum_{k \in K} q_{ij}^k(t)\right),$$

where $\eta_{ij}^k(t+1)$ is the iteration coefficient after the updating; $\eta_{ij}^k(t)$ is the iteration coefficient before the updating; $U_{ji}$ is the upload bandwidth of each child node; $Q_k(t)$ is the current total content demand; $X_{ij}^k(t)$ is the current storage policy; $\lambda_{ij}^k$ is the user request arrival rate; K is a content set; k is each content in the content set K; $s_k$ is a size of each content k; i and j are non-zero positive integers; a function $$f\left(\sum_{k \in K} q_{ij}^k(t)\right)$$

is a function positively related to $(1 - \Sigma_{k \in K} q_{ij}^k(t))$; $\theta(t) = 1/t$ is a step length in an iteration process; and t is the number of iterations of the iteration coefficient.

Unlike the prior art, in the embodiments of the present invention, parameters such as the user request arrival rate, the storage capacity and upload bandwidth of each child node, and the size of each content are fully considered, and these parameters are used to optimize the optimal storage policy and the optimal upload bandwidth allocation policy of each child node with respect to each content, which can save network bandwidth as much as possible and implement coordination among cache nodes, and is compatible with a heterogeneous network resource environment.

DETAILED DESCRIPTION

An object of the present invention is to, with respect to the characteristics of a distributed caching system and the defect of the conventional caching mechanism in the prior art, provide a caching method and system for a multi-layer video network, so as to ensure full use of existing network resources according to actual system requirements.

The present invention is intended for a caching system for a multi-layer video network. The system, by using a system topology structure, heterogeneous user request modes, storage resources of nodes, and bandwidth resources on layers as input, and with the optimization target of maximizing the number of supportable requests, proposes a storage policy and a dynamic request routing policy for each cache node.

Figure 1:
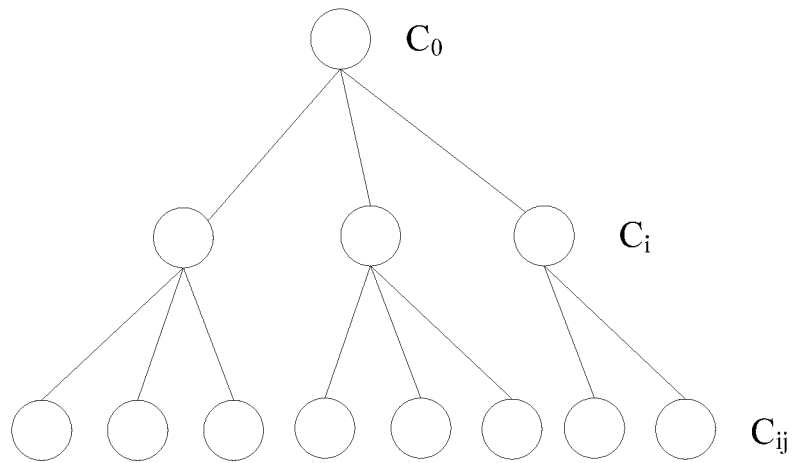
FIG. 1 is a schematic structural diagram of a network topology of a multi-layer video network according to an exemplary embodiment of the present invention.

FIG. 1 is a schematic structural diagram of a network topology of a multi-layer video network according to an exemplary embodiment of the present invention. As shown in FIG. 1, a top-layer node $C_0$ is a root node of an entire video system and stores all video resources in the system. A set of video contents is referred to as a content set K. A sub-layer node $C_i$ is an $i^{th}$ child node of the top-layer node. A bottom-layer node $C_{ij}$ is a $j^{th}$ child node of the sub-layer node $C_i$. When the system is in operation, a user initiates a content request to a bottom-layer node connected thereto, so as to obtain a specific content k in the content set K. This multi-layer topology structure may be expanded to have more layers according to a system scale and actual system deployment.

Figure 2:
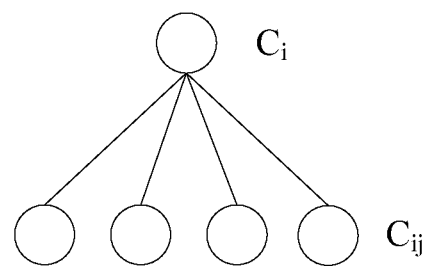
FIG. 2 is a schematic structural diagram of a network topology of a sub-processing area of a multi-layer video network according to an exemplary embodiment of the present invention.

It is defined that each parent node and all child nodes thereof form a sub-processing area. Referring to FIG. 2, FIG. 2 is a schematic structural diagram of a network topology of a sub-processing area in a multi-layer video network according to an exemplary embodiment of the present invention. As shown in FIG. 2, the sub-layer node $C_i$ is a parent node, and the sub-layer node $C_i$ and all child nodes $C_{ij}$ thereof form a sub-processing area. Each child node $C_{ij}$ has a known user request arrival rate $\lambda_{ij}^k$, where the value indicates the number of access requests for the content k arriving at the child node $C_{ij}$ within unit time.

Figure 3:
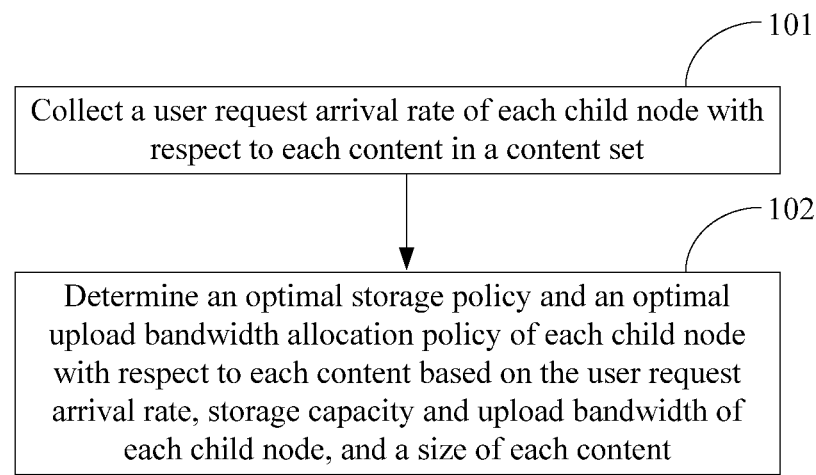
FIG. 3 is a flowchart of a caching method for a multi-layer video network according to a first embodiment of the present invention.

Referring to FIG. 3, FIG. 3 is a flowchart of a caching method for a multi-layer video network according to a first embodiment of the present invention. As shown in FIG. 3, in the embodiment, the caching method for the multi-layer video network includes the following steps:

Step 101: Collect a user request arrival rate of each child node with respect to each content in a content set.

Step 102: Determine an optimal storage policy and an optimal upload bandwidth allocation policy of each child node with respect to each content based on the user request arrival rate, storage capacity and upload bandwidth of each child node, and a size of each content.

Parameters such as the user request arrival rate, the storage capacity and upload bandwidth of each child node, and the size of each content are fully considered, and these parameters are used to optimize the optimal storage policy and the optimal upload bandwidth allocation policy of each child node with respect to each content, which can save network bandwidth as much as possible and implement coordination among cache nodes, and is compatible with a heterogeneous network resource environment.

Figure 4:
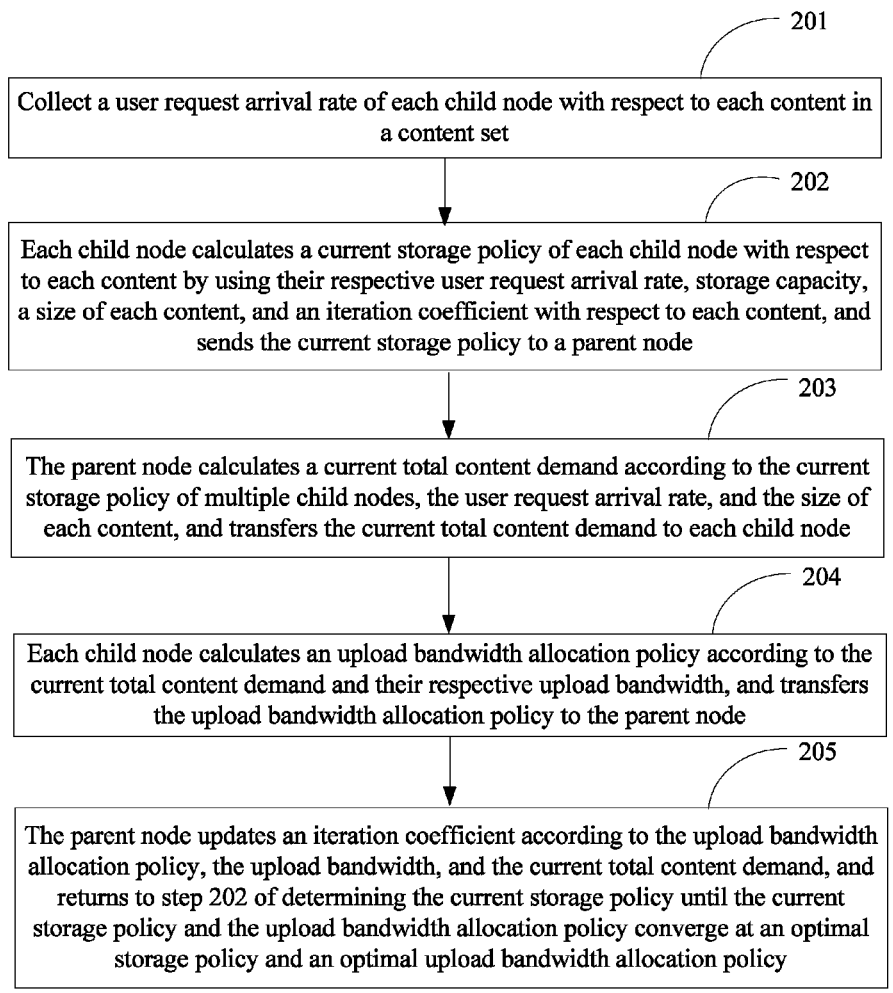
FIG. 4 is a flowchart of a caching method for a multi-layer video network according to a second embodiment of the present invention.

Referring to FIG. 4, FIG. 4 is a flowchart of a caching method for a multi-layer video network according to a second embodiment of the present invention. As shown in FIG. 4, in the embodiment, the node $C_i$ is used to represent a parent node, and the node $C_{ij}$ is used to represent each child node. The caching method for the multi-layer video network according to the present invention includes the following steps:

Step 201: Collect a user request arrival rate of each child node $C_{ij}$ with respect to each content in a content set.

In step 201, the $C_{ij}$ is used to represent each child node, K is used to represent a content set, k is used to represent each content in the content set, $\forall k \in K$, and $\lambda_{ij}^k$ is used to represent a user request arrival rate of each content k.

Step 202: Each child node $C_{ij}$ calculates a current storage policy $X_{ij}^k(t)$ of each child node $C_{ij}$ with respect to each content k by using the user request arrival rate $\lambda_{ij}^k$ of each child node, storage capacity $B_{ij}$, a size $s_k$ of each content k, and an iteration coefficient $\eta_{ij}^k$ with respect to each content k, and sends the current storage policy $X_{ij}^k(t)$ to the parent node $C_i$.

In step 202, the storage policy $X_{ij}^k(t)$ is:

$$X_{ij}^k(t) = \begin{cases} 1, & \text{for } k \in [1, z); \\ 0, & \text{for } k \in [z|K|] \end{cases} \quad (1)$$

where, $z = \min\{h : \Sigma_{k=1}^h s_k > B_{ij}\}$.

The equation (1) may be obtained according to the following relationship:
subject to $$\sum_{k \in K} s_k X_{ij}^k \leq B_{ij} \text{ and } X_{ij}^k = \{0, 1\} \ \forall k \in K,$$

maximize $$\sum_{k \in K} (1 - \eta_{ij}^k) \lambda_{ij}^k s_k X_{ij}^k.$$

In the storage policy $X_{ij}^k(t)$, when $X_{ij}^k(t)=1$, the child node $C_{ij}$ stores the content k; and when $X_{ij}^k(t)=0$, the child node $C_{ij}$ does not store the content k.

The following further describes the foregoing relationship equation. In the relationship equation disclosed above, the storage capacity of the child node $C_{ij}$ is defined as $B_{ij}$. Upload bandwidth from each child node $C_{ij}$ to the parent node $C_i$ is defined as $U_{ij}$. A rate of the upload bandwidth of the child node $C_{ij}$ that is used to serve the request for the content k is defined as $q_{ij}^k$. A size of the content k is defined as $s_k$. In an actual network environment, a video content generally is segmented according to a fixed size; therefore, each content k has a fixed size $s_k$. $X_{ij}^k(t)$ is defined as the storage policy of the child node. If $X_{ij}^k(t)=1$, the child node stores the content k. If $X_{ij}^k(t)=0$, the child node does not store the content k. The problem of optimizing the storage policy of the sub-processing area (which includes the node $C_i$ and the node $C_{ij}$ as described above) is defined as follows:
subject to relationships such as $$\sum_{k \in K} s_k X_{ij}^k \leq B_{ij} \ \forall j \in J,$$

$$\sum_{j \in J} q_{ij}^k U_{ji} \leq \sum_{j \in J} \lambda_{ij}^k s_k (1 - X_{ij}^k) \ \forall k \in K,$$

$$\sum_{k \in K} q_{ij}^k \leq 1 \ \forall j \in J,$$

$$0 \leq q_{ij}^k \leq X_{ij}^k \ \forall j \in J, k \in K,$$

and $X_{ij}^k = \{0,1\} \ \forall j \in J, k \in K$, maximize $$\sum_{j \in J} \sum_{k \in K} q_{ij}^k U_{ji} + \sum_{j \in J} \sum_{k \in K} \lambda_{ij}^k s_k X_{ij}^k.$$

The optimization target is to maximize the number of requests that the system can support, and optimization parameters are the storage policy $X_{ij}^k(t)$ and the upload bandwidth allocation policy $q_{ij}^k(t)$. The present invention uses an approximation method based on the Lagrange relaxation method to obtain a distributed solution. The Lagrange multiplier is defined as $\eta_{ij}^k$, where $\eta_{ij}^k$ reflects an intention of each child node $C_{ij}$ to store the content k and an intention of each child node to share the content with its neighboring child nodes. $\eta_{ij}^k$ is used as an iteration coefficient. The storage policy optimization problem corresponding to each child node $C_{ij}$ is defined as:
subject to $$\sum_{k \in K} s_k X_{ij}^k \le B_{ij},$$

where $X_{ij}^k = \{0,1\}\ \forall k \in K$, maximize $$\sum_{k \in K} (1 - \eta_{ij}^k) \lambda_{ij}^k s_k X_{ij}^k.$$

Therefore, an optimal storage policy corresponding to the optimization problem is:

$$X_{ij}^k(t) = \begin{cases} 1, & \text{for } k \in [1, z); \\ 0, & \text{for } k \in [z, |K|], \end{cases}$$

where the content set K is sorted in a descending order according to an index $(1-\eta_{ij}^k)\lambda_{ij}^k$, and $z=\min\{h:\Sigma_{k=1}^h s_k > B_{ij}\}$. This result represents an optimized storage policy of the child node in a $t^{th}$ iteration process. Each child node $C_{ij}$ calculates the result of $X_{ij}^k(t)$ by using local information of each child node in a distributed way, and sends the result to the parent node $C_i$.

Step 203: The parent node $C_i$ calculates a current total content demand $Q_k(t)$ according to the current storage policy $X_{ij}^k(t)$ of multiple child nodes $C_{ij}$, the user request arrival rate $\lambda_{ij}^k$, and the size $s_k$ of each content k, and transfers the current total content demand $Q_k(t)$ to each child node $C_{ij}$.

In step 203, the current total content demand $Q_k(t)$ is obtained from the following equation:

$$Q_k(t) = \sum_{j \in J} \lambda_{ij}^k s_k (1 - X_{ij}^k(t)). \qquad (2)$$

Step 204: Each child node $C_{ij}$ calculates an upload bandwidth allocation policy $q_{ij}^k(t)$ according to the current total content demand $Q_k(t)$ and the upload bandwidth $U_{ji}$ of each child node, and transfers the upload bandwidth allocation policy $q_{ij}^k(t)$ to the parent node $C_i$.

In step 204, the upload bandwidth allocation policy $q_{ij}^k(t)$ is obtained from the following equation:

$$q_{ij}^k(t) = \begin{cases} \dfrac{Q_k(t)}{U_{ji}} & \text{for } k \in [1, z) \text{ and } X_{ij}^k(t) = 1; \\ \dfrac{U_{ji} - \sum_{k=1}^{z-1} Q_k(t)}{U_{ji}} & \text{for } k = z; \\ 0 & \text{for } k \in (z, |K|] \text{ or } X_{ij}^k(t) = 0, \end{cases} \qquad (3)$$

where, $$z = \min\{h:\Sigma_{k=1}^h Q_k(t)X_{ij}^k(t) > U_{ji}\}. \qquad (4)$$

The equation (3) may be obtained according to the following relationship:
subject to $$\sum_{k \in K} q_{ij}^k \le 1, \ q_{ij}^k U_{ji} \le Q_k(t), \text{ and } 0 \le q_{ij}^k \le X_{ij}^k(t),$$

maximize $$\sum_{k \in K} (U_{ji} - \eta_{ij}^k U_{ji}) q_{ij}^k.$$

The content set K is sorted in a descending order according to an index $(1-\eta_{ij}^k)$, and $z=\min\{h:\Sigma_{k=1}^h Q_k(t)X_{ij}^k(t) > U_{ji}\}$. This result represents an upload bandwidth allocation policy of the child node $C_{ij}$ in a $t^{th}$ iteration process.

Step 205: The parent node $C_i$ updates the iteration coefficient $\eta_{ij}^k$ according to the upload bandwidth allocation policy $q_{ij}^k(t)$, the upload bandwidth $U_{ij}$, and the current total content demand $Q_k(t)$, and return to step 202 of determining the current storage policy $X_{ij}^k(t)$ until the current storage policy $X_{ij}^k(t)$ and the upload bandwidth allocation policy $q_{ij}^k(t)$ converge at the optimal storage policy $X_{ij}^{k*}(t)$ and the optimal upload bandwidth allocation policy $q_{ij}^{k*}(t)$.

In step 205, the iteration coefficient $\eta_{ij}^k$ is updated according to the following equation:

$$\eta_{ij}^k(t+1) = \eta_{ij}^k(t) + \theta(t)\left(\sum_{j \in J} q_{ij}^k(t)U_{ji} - Q_k(t)\right) * f\left(\sum_{k \in K} q_{ij}^k(t)\right), \qquad (5)$$

where a function $$f\left(\sum_{k \in K} q_{ij}^k(t)\right)$$

is a function positively related to $(1-\Sigma_{k \in K} q_{ij}^k(t))$; and $\theta(t)=1/t$ is a step length in the iteration process, which ensures rapid convergence in the entire iteration process.

When upload bandwidth for a request for the content k is insufficient, an iteration value of the Lagrange multiplier $\eta_{ij}^k$ decreases, thereby encouraging the child node to store and share the content to a larger extent in a next iteration process. Correspondingly, when upload bandwidth for a request for the content k is surplus, an iteration value of the Lagrange multiplier increases, thereby encouraging the child node to suppress the storage and sharing of the content in the next iteration process.

The function $$f\left(\sum_{k \in K} q_{ij}^k(t)\right)$$

is any function positively related to $(1-\Sigma_{k \in K} q_{ij}^k(t))$; and $\theta(t)=1/t$ is a step length in the iteration process, which ensures rapid convergence in the entire iteration process.

The result of the sub-processing area optimization method obtained in step 202 may determine a policy for request routing in the sub-processing area. With respect to each request arriving at the child node $C_{ij}$, if $X_{ij}^k$ equals 1, that is, the node $C_{ij}$ has stored corresponding content, the content k is directly returned; if $X_{ij}^k$ equals 0, that is, the node does not store the corresponding content, the request is sent to the parent node $C_i$.

If the parent node $C_i$ stores the corresponding content, the corresponding content is returned, where a caching policy of the parent node $C_i$ is determined according to a rule to be disclosed as follows. Otherwise, the parent node $C_i$ determines, according to $q_{ij}^{k*}(t)$ in step 205, to dynamically send the request to a certain child node $C_{ij}$, so as to implement caching coordination. A probability of forwarding the request for the content k to the child node $C_{ij}$ is:

$$R_{bj}^k = \frac{q_{ij}^{k*} U_{ji}}{\sum_{j \in J} \lambda_{ij}^k s_k (1 - X_{ij}^{k*})}.$$

A remaining request that is not satisfied is further sent to an upper-layer node of the parent node, and request routing processing is performed again.

A storage allocation and request routing policy of the sub-processing area is an iteration process. Therefore, the embodiment of the present invention is suitable for a topology with more layers. When values of $X_{ij}^k$ and $q_{ij}^k$ of nodes at a certain layer converge at optimal values $q_{ij}^{k*}$ and $X_{ij}^{k*}$, the sub-processing area illustrated in FIG. 4 moves upwards. That is, the parent node in the original problem is converted into a child node in a new problem.

The request arrival rate of each child node $C_i$ is:

$$\lambda_i^k = \sum_{j \in J} \lambda_{ij}^k (1 - X_{ij}^{k*}) - \sum_{j \in J} q_{ij}^{k*} U_{ji}/s_k$$

$$\forall i \in I, k \in K.$$

The solution of the subsequent storage allocation and request routing policy problem is similar to the description above.

Figure 5:
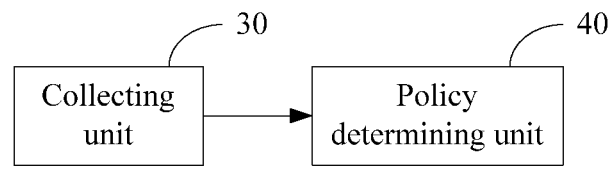
FIG. 5 is a schematic structural diagram of a caching system for a multi-layer video network according to a third embodiment of the present invention.

Referring to FIG. 5, FIG. 5 is a schematic system structural diagram of a caching system for a multi-layer video network according to a third embodiment of the present invention. As shown in FIG. 5, in the third embodiment of the present invention, the multi-layer video network includes at least one parent node and multiple child nodes connected to the parent node, and a caching system for the multi-layer video network includes a collecting unit 30 and a policy determining unit 40.

The collecting unit 30 is configured to collect a user request arrival rate of each child node with respect to each content in a content set. The policy determining unit 40 is configured to determine an optimal storage policy and an optimal upload bandwidth allocation policy of each child node with respect to each content based on the user request arrival rate, storage capacity and upload bandwidth of each child node, and a size of each content.

Figure 6:
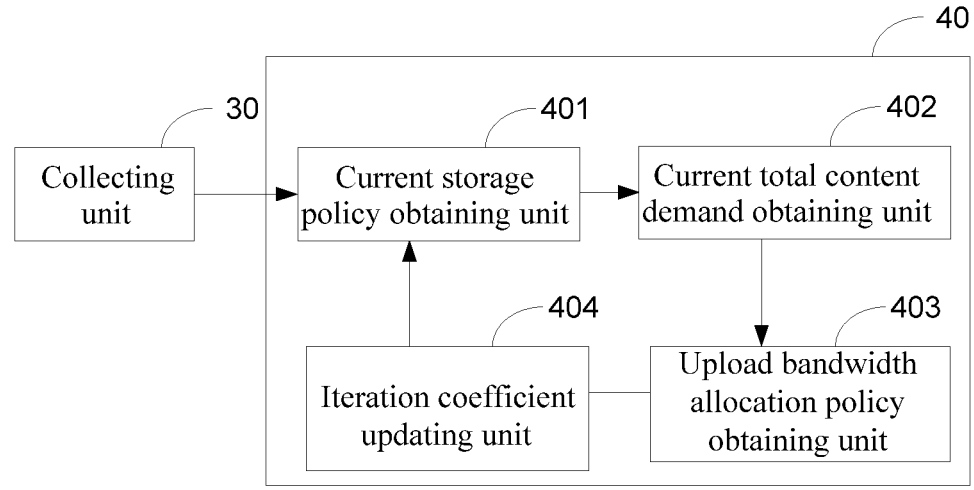
FIG. 6 is a schematic system structural diagram of a caching system for a multi-layer video network according to a fourth embodiment of the present invention.

Referring to FIG. 6, FIG. 6 is a schematic system structural diagram of a caching system for a multi-layer video network according to a fourth embodiment of the present invention. As shown in FIG. 6, in the fourth embodiment of the present invention, a caching system for the multi-layer video network includes a collecting unit 30 and a policy determining unit 40, where the policy determining unit 40 includes a current storage policy obtaining unit 401, a current total content demand obtaining unit 402, an upload bandwidth allocation policy obtaining unit 403, and an iteration coefficient updating unit 404.

The current storage policy obtaining unit 401 is set in each child node and is configured to calculate a current storage policy of each child node with respect to each content by using the user request arrival rate in each child node, the storage capacity, the size of each content, and an iteration coefficient with respect to each content, and send the current storage policy to the parent node.

The current total content demand obtaining unit 402 is set in the parent node and is configured to calculate a current total content demand according to the current storage policy of multiple child nodes, the user request arrival rate, and the size of each content, and transfer the current total content demand to each child node.

The upload bandwidth allocation policy obtaining unit 403 is set in each child node and is configured to calculate the upload bandwidth allocation policy according to the current total content demand and upload bandwidth of each child node, and transfer the upload bandwidth allocation policy to the parent node.

The iteration coefficient updating unit 404 is set in the parent node and is configured to update the iteration coefficient according to the upload bandwidth allocation policy, the upload bandwidth, and the current total content demand, and return the updated iteration coefficient to the current storage policy obtaining unit 401 until the current storage policy obtaining unit 401 determines that the current storage policy and the upload bandwidth allocation policy converge at an optimal storage policy and an optimal upload bandwidth allocation policy.

Specific operation modes of the collecting unit 30, the current storage policy obtaining unit 401, the current total content demand obtaining unit 402, the upload bandwidth allocation policy obtaining unit 403, and the iteration coefficient updating unit 404 have been described in detail in the foregoing embodiments, and are not described repeatedly herein.

Figure 7:
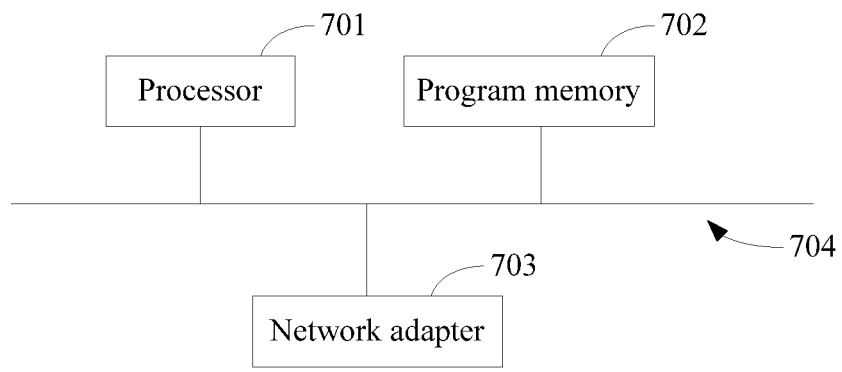
FIG. 7 is a schematic structural diagram of hardware of a child node in a caching system for a multi-layer video network according to a fifth embodiment of the present invention.

Referring to FIG. 7, FIG. 7 is a schematic structural diagram of hardware of a child node in a caching system for a multi-layer video network according to a fifth embodiment of the present invention.

As shown in FIG. 7, a child node includes a processor 701, a program memory 702, a network adapter 703, and a bus 704, where the processor 701, the program memory 702, and the network adapter 703 are coupled by using the bus 704.

The program memory 702 stores: a first instruction for controlling the network adapter 703 to collect a user request arrival rate of the child node with respect to each content in a content set; a second instruction for calculating a current storage policy of each child node with respect to each content by using the user request arrival rate in the child node, storage capacity, a size of each content, and an iteration coefficient with respect to each content; a third instruction for controlling the network adapter 703 to send the current storage policy to the parent node; a fourth instruction for controlling the network adapter 703 to calculate an upload bandwidth allocation policy according to a current total content demand obtained from the parent node and upload bandwidth of each child node, and transfer the upload bandwidth allocation policy to the parent node; a fifth instruction for calculating the upload bandwidth allocation policy according to the current total content demand and the upload bandwidth of each child node; and a sixth instruction for controlling the network adapter 703 to transfer the upload bandwidth allocation policy to the parent node.

The processor 701 executes the first to sixth instructions.

In the second instruction, the current storage policy is defined as:

$$X_{ij}^k(t) = \begin{cases} 1, & \text{for } k \in [1, z); \\ 0, & \text{for } k \in [z, |K|], \end{cases}$$

where $X_{ij}^k(t)$ is the current storage policy; $z=\min\{h: \Sigma_{k=1}^h s_k > B_{ij}\}$; K is a content set; k is each content in the content set K; $s_k$ is a size of each content k; $B_{ij}$ is storage capacity; i and j are non-zero positive integers; h is a positive number; when $X_{ij}^k(t)=1$, the content k is stored; when $X_{ij}^k(t)=0$, the content k is not stored; and t is the number of iterations of the iteration coefficient.

In the fifth instruction, the processor 701 calculates the upload bandwidth allocation policy according to the following equation:

$$q_{ij}^k(t) = \begin{cases} \dfrac{Q_k(t)}{U_{ji}} & k \in [1, z) \text{ and } X_{ij}^k(t) = 1; \\ \dfrac{U_{ji} - \sum_{k=1}^{z-1} Q_k(t)}{U_{ji}} & k = z; \\ 0 & k \in (z, |K|] \text{ or } X_{ij}^k(t) = 0, \end{cases}$$

where $q_{ij}^k(t)$ is the upload bandwidth allocation policy; $Q_k(t)$ is the current total content demand; $X_{ij}^k(t)$ is the current storage policy; $\lambda_{ij}^k$ is the user request arrival rate; $U_{ji}$ is the upload bandwidth of the child node; $z=\min\{h:\Sigma_{k=1}^h s_k > B_{ij}\}$; K is a content set; k is each content in the content set K; $s_k$ is a size of each content k; $B_{ij}$ is the storage capacity of the child node; i and j are non-zero positive integers; h is a positive integer; and t is the number of iterations of the iteration coefficient.

Figure 8:
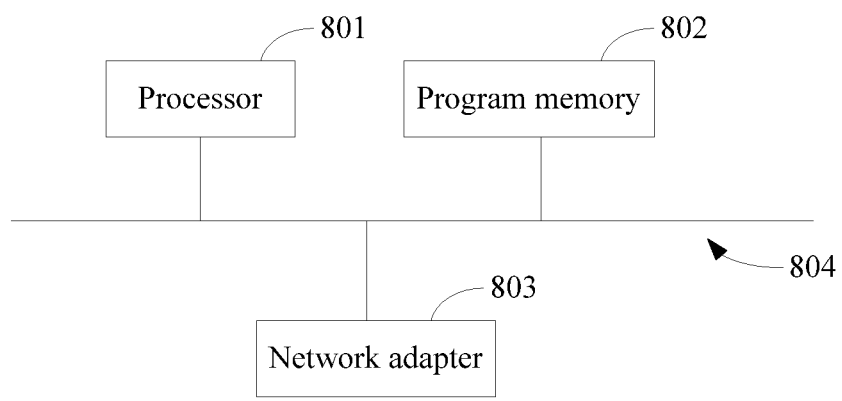
FIG. 8 is a schematic structural diagram of hardware of a parent node in a caching system for a multi-layer video network according to a fifth embodiment of the present invention.

Referring to FIG. 8, FIG. 8 is a schematic structural diagram of hardware of a parent node in a caching system for a multi-layer video network according to a fifth embodiment of the present invention.

As shown in FIG. 8, a parent node includes a processor 801, a program memory 802, a network adapter 803, and a bus 804, where the processor 801, the program memory 802, and the network adapter 803 are coupled by using the bus 804.

The program memory 802 stores:

a seventh instruction for calculating a current total content demand according to current storage policies obtained respectively from multiple child nodes, a user request arrival rate, and a size of each content; an eighth instruction for controlling the network adapter 803 to transfer the current content demand to each child node; a ninth instruction for updating an iteration coefficient according to upload bandwidth allocation policies obtained respectively from multiple child nodes, upload bandwidth, and the current total content demand; and a tenth instruction for controlling the network adapter 803 to return the updated iteration coefficient to each child node until each child node determines that the current storage policy and the upload bandwidth allocation policy converge at an optimal storage policy and an optimal upload bandwidth allocation policy.

The processor 801 executes the seventh to tenth instructions.

In the seventh instruction, the current total content demand is obtained according to the following equation:

$$Q_k(t) = \sum_{i \in J} \lambda_{ij}^k s_k (1 - X_{ij}^k(t)),$$

where $Q_k(t)$ is the current total content demand; $X_{ij}^k(t)$ is the current storage policy; $\lambda_{ij}^k$ is the user request arrival rate; K is a content set; k is each content in the content set K; $s_k$ is a size of each content k; i, j, and J are non-zero positive integers; h is a positive number; and t is the number of iterations of the iteration coefficient.

In the tenth instruction, the iteration coefficient is updated according to the following equation:

$$\eta_{ij}^k(t+1) = \eta_{ij}^k(t) + \theta(t)\left(\sum_{j \in J} q_{ji}^k(t) U_{ji} - Q_k(t)\right) * f\left(\sum_{k \in K} q_{ij}^k(t)\right),$$

where $\eta_{ij}^k(t+1)$ is the iteration coefficient after the updating; $\eta_{ij}^k(t)$ is the iteration coefficient before the updating; $U_{ji}$ is the upload bandwidth of each child node; $Q_k(t)$ is the current total content demand; $X_{ij}^k(t)$ is the current storage policy; $\lambda_{ij}^k$ is the user request arrival rate; K is a content set; k is each content in the content set K; $s_k$ is a size of each content k; i and j are non-zero positive integers; a function $$f\left(\sum_{k \in K} q_{ij}^k(t)\right)$$

is a function positively related to $(1-\Sigma_{k \in K} q_{ij}^k(t))$; $\theta(t)=1/t$ is a step length in an iteration process; and t is the number of iterations of the iteration coefficient.

According to the content disclosed above, the present invention has the following system features: a caching policy is intended for an existing high-definition video system having a feature of high bandwidth consumption, and a dynamic request routing policy can implement coordination among distributed cache nodes in a better way, which can solve the caching policy optimization problem in a heterogeneous resource environment.

In the present invention, the caching optimization policy intended for a network system having the feature of high bandwidth consumption is proposed, which is especially suitable for being applied in a network video system. The present invention designs a distributed caching policy for the high-definition video system by using limited bandwidth resources among nodes as a key factor, which is more practical.

In addition, the present invention proposes the caching optimization policy intended for a large-scale network system with heterogeneous system structures and heterogeneous user requests. The present invention uses operation parameters of a heterogeneous system as input, and obtains an optimized distributed caching policy by using an approximation method based on the Lagrange relaxation method.

Moreover, the present invention proposes a dynamic request routing policy intended for terminal user requests. By using the caching optimization policy based on a current system condition, the system can implement dynamic routing for user requests in the system, so as to implement coordination among distributed cache servers at different layers, thereby improving utilization ratio of system resources.

The present invention may be intended for a caching system for a multi-layer video network, and may bring the following benefits:

(1) by using a distributed approximation method based on the Lagrange relaxation method, a distributed policy for large-scale cache servers can be implemented, so as to reduce temporal complexity in finding a high-efficiency caching policy and improve system efficiency;

(2) a bandwidth limit that is common in actual video systems is considered, so as to improve applicability of a distributed caching policy;

(3) a dynamic routing policy for user requests is proposed, which can implement resource sharing among cache servers at the same layer, so as to improve an overall utilization ratio of the system resources; and (4) the heterogeneity of system storage resources, bandwidth resources, and user request modes is considered in the optimization problem and the corresponding distributed optimization solution, which complies with the features of an actual distributed caching system in a better way, so as to satisfy design requirements of the actual system.

The present invention solves the caching policy problem in high-definition network video systems represented by an IPTV system, which includes two problems, namely, the storage policy problem of distributed cache servers and the dynamic routing policy problem of users' content requests. The present invention is intended to maximize the number of user requests that may be supported by an existing system infrastructure, divides the caching policy problem into a multi-layer optimization problem, and determines the technical solution for the caching system in a bottom-up manner.

The foregoing descriptions are merely embodiments of the present invention, and are not intended to limit the scope of the present invention. Any equivalent structure or equivalent process alternation made by using the content of the specification and drawings of the present invention, or directly or indirectly applying the content of the specification and drawings of the present invention to other related technical fields, shall fall within the protection scope of the present invention.

What is claimed is:

1. A caching method for a multi-layer video network, wherein the multi-layer video network comprises at least one parent node and multiple child nodes connected to the parent node, comprising:
    collecting a user request arrival rate of each child node with respect to each content in a content set; and
    determining an optimal storage policy and an optimal upload bandwidth allocation policy of each child node with respect to each content based on the user request arrival rate, storage capacity and upload bandwidth of each child node, and a size of each content,
    wherein determining the optimal storage policy and the optimal upload bandwidth allocation policy of each child node with respect to each content based on the user request arrival rate, the storage capacity and the upload bandwidth of each child node, and the size of each content comprises:
        calculating, by each child node, a current storage policy of each child node with respect to each content by using the user request arrival rate of each child node, the storage capacity, the size of each content, and an iteration coefficient with respect to each content, and sending the current storage policy to the parent node;
        calculating, by the parent node, a current total content demand according to the current storage policy of the multiple child nodes, the user request arrival rate, and the size of each content, and transferring the current total content demand to each child node;
        calculating, by each child node, an upload bandwidth allocation policy according to the current total content demand and the upload bandwidth of each child node, and transferring to the parent node; and
        updating, by the parent node, the iteration coefficient according to the upload bandwidth allocation policy, the upload bandwidth, and the current total content demand, and returning to the step of determining the current storage policy until the current storage policy and the upload bandwidth allocation policy converge at the optimal storage policy and the optimal upload bandwidth allocation policy,
    wherein calculating, by each child node, the current storage policy of each child node with respect to each content by using the user request arrival rate of each child node, the storage capacity, the size of each content, and the iteration coefficient with respect to each content comprises:
        defining the current storage policy as follows in each child node:

$$X_{ij}^k(t) = \begin{cases} 1, & \text{for } k \in [1, z); \\ 0, & \text{for } k \in [z, |K|], \end{cases}$$

wherein $X_{ij}^k(t)$ is the current storage policy,
    wherein $z = \min\{h : \Sigma_{k=1}^{h} s_k > B_{ij}\}$,
    wherein K is the content set,
    wherein k is each content in the content set K,
    wherein $s_k$ is a size of each content k,
    wherein $B_{ij}$ is the storage capacity,
    wherein i and j are non-zero positive integers,
    wherein h is a positive number,
    wherein when $X_{ij}^k(t)=1$, the child node stores the content k,
    wherein when $X_{ij}^k(t)=0$, the child node does not store the content k, and
    wherein t is the number of iterations of the iteration coefficient.

2. A caching method for a multi-layer video network, wherein the multi-layer video network comprises at least one parent node and multiple child nodes connected to the parent node, comprising:
    collecting a user request arrival rate of each child node with respect to each content in a content set; and
    determining an optimal storage policy and an optimal upload bandwidth allocation policy of each child node with respect to each content based on the user request arrival rate, storage capacity and upload bandwidth of each child node, and a size of each content,
    wherein determining the optimal storage policy and the optimal upload bandwidth allocation policy of each child node with respect to each content based on the user request arrival rate, the storage capacity and the upload bandwidth of each child node, and the size of each content comprises:
        calculating, by each child node, a current storage policy of each child node with respect to each content by using the user request arrival rate of each child node, the storage capacity, the size of each content, and an iteration coefficient with respect to each content, and sending the current storage policy to the parent node;
        calculating, by the parent node, a current total content demand according to the current storage policy of the multiple child nodes, the user request arrival rate, and the size of each content, and transferring the current total content demand to each child node;
        calculating, by each child node, an upload bandwidth allocation policy according to the current total content demand and the upload bandwidth of each child node, and transferring to the parent node; and
        updating, by the parent node, the iteration coefficient according to the unload bandwidth allocation policy, the upload bandwidth, and the current total content demand, and returning to the step of determining the current storage policy until the current storage policy and the upload bandwidth allocation policy converge at the optimal storage policy and the optimal upload bandwidth allocation policy,
wherein calculating, by the parent node, the current total content demand according to the current storage policy of the multiple child nodes, the user request arrival rate, and the size of each content comprises:
obtaining the current total content demand according to the following equation:

$$Q_k(t) = \sum_{i \in J} \lambda_{ij}^k s_k (1 - X_{ij}^k(t)),$$

wherein $Q_k(t)$ is the current total content demand,
wherein $X_{ij}^k(t)$ is the current storage policy,
wherein $\lambda_{ij}^k$ is the user request arrival rate,
wherein K is a content set,
wherein k is each content in the content set K,
wherein $s_k$ is a size of each content k,
Wherein i, j, and J are non-zero positive integers, and
wherein t is the number of iterations of the iteration coefficient.

3. A caching method for a multi-layer video network, wherein the multi-layer video network comprises at least one parent node and multiple child nodes connected to the parent node, comprising:
collecting a user request arrival rate of each child node with respect to each content in a content set; and
determining an optimal storage policy and an optimal upload bandwidth allocation policy of each child node with respect to each content based on the user request arrival rate, storage capacity and upload bandwidth of each child node, and a size of each content,
wherein determining the optimal storage policy and the optimal upload bandwidth allocation policy of each child node with respect to each content based on the user request arrival rate, the storage capacity and the upload bandwidth of each child node, and the size of each content comprises:
  calculating, by each child node, a current storage policy of each child node with respect to each content by using the user request arrival rate of each child node, the storage capacity, the size of each content, and an iteration coefficient with respect to each content, and sending the current storage policy to the parent node;
  calculating, by the parent node, a current total content demand according to the current storage policy of the multiple child nodes, the user request arrival rate, and the size of each content, and transferring the current total content demand to each child node;
  calculating, by each child node, an upload bandwidth allocation policy according to the current total content demand and the upload bandwidth of each child node, and transferring to the parent node; and
  updating, by the parent node, the iteration coefficient, according to the upload bandwidth allocation policy, the upload bandwidth, and the current total content demand, and returning, to the step of determining the current storage policy until the current storage policy and the upload bandwidth allocation policy converge at the optimal storage policy and the optimal upload bandwidth allocation policy,
wherein calculating, by each child node, the upload bandwidth allocation policy according to the current total content demand and the upload bandwidth of each child node comprises:

calculating the upload bandwidth location policy according to the following equation:

$$q_{ij}^k(t) = \begin{cases} \dfrac{Q_k(t)}{U_{ji}} & k \in [1, z) \text{ and } X_{ij}^k(t) = 1; \\ \dfrac{U_{ji} - \sum_{k=1}^{z-1} Q_k(t)}{U_{ji}} & k = z; \\ 0 & k \in (z, |K|] \text{ or } X_{ij}^k(t) = 0 \end{cases}$$

wherein $q_{ij}^k(t)$ is the upload bandwidth allocation policy,
wherein $Q_k(t)$ is the current total content demand,
wherein $X_{ij}^k(t)$ is the current storage policy,
wherein $\lambda_{ij}^k$ is the user request arrival rate,
wherein $U_{ji}$ is the upload bandwidth of each child node,
wherein $z = \min\{h : \Sigma_{k=1}^{h} s_k > B_{ij}\}$,
wherein K is a content set,
wherein k is each content in the content set K,
wherein $s_k$ is a size of each content k,
wherein $B_{ij}$ is the storage capacity of each child node,
wherein i and j are non-zero positive integers,
wherein h is a positive integer, and
wherein t is the number of iterations of the iteration coefficient.

4. A caching method for a multi-layer video network, wherein the multi-layer video network comprises at least one parent node and multiple child nodes connected to the parent node, comprising:
collecting a user request arrival rate of each child node with respect to each content in a content set; and
determining an optimal storage policy and an optimal upload bandwidth allocation policy of each child node with respect to each content based on the user request arrival rate, storage capacity and upload bandwidth of each child node, and a size of each content,
wherein determining the optimal storage policy and the optimal upload bandwidth allocation policy of each child node with respect to each content based on the user request arrival rate, the storage capacity and the upload bandwidth of each child node, and the size of each content comprises:
  calculating, by each child node, a current storage policy of each child node with respect to each content by using the user request arrival rate of each child node, the storage capacity, the size of each content, and an iteration coefficient with respect to each content, and sending the current storage policy to the parent node;
  calculating, by the parent node, a current total content demand according to the current storage policy of the multiple child nodes, the user request arrival rate, and the size of each content, and transferring the current total content demand to each child node;
  calculating, by each child node, an upload bandwidth allocation policy according to the current total content demand and the upload bandwidth of each child node, and transferring to the node; and
  updating, by the parent node, the iteration coefficient according to the upload bandwidth allocation policy, the upload bandwidth, and the current total content demand, and returning to the step of determining the current storage policy until the current storage policy and the upload bandwidth allocation policy converge at the optimal storage policy and the optimal upload bandwidth allocation policy, wherein updating, by the parent node, the iteration coefficient according to the upload bandwidth allocation policy, the upload bandwidth, and the current total content demand comprises:
  updating the iteration coefficient according to the following equation:

$$\eta_{ij}^k(t+1) = \eta_{ij}^k(t) + \theta(t)\left(\sum_{j\in J} q_{ij}^k(t)U_{ji} - Q_k(t)\right) * f\left(\sum_{k\in K} q_{ij}^k(t)\right),$$

wherein $\eta_{ij}^k(t+1)$ is the iteration coefficient after the updating,
  wherein $\eta_{ij}^k(t)$ is the iteration coefficient before the updating,
  wherein $U_{ji}$ is the upload bandwidth of each child node,
  wherein $Q_k(t)$ is the current total content demand,
  wherein $X_{ij}^k(t)$ is the current storage policy,
  wherein $\lambda_{ij}^k$ is the user request arrival rate,
  wherein K is a content set,
  wherein k is each content in the content set K,
  wherein $s_k$ is a size of each content k,
  wherein i and j are non-zero positive integers,
  wherein a function $$f\left(\sum_{k\in K} q_{ij}^k(t)\right)$$

is a function positively related to $(1-\Sigma_{k\in K}q_{ij}^k(t))$,
  wherein $\theta(t)=1/t$ is a step length in an iteration process, and
  wherein t is the number of iterations of the iteration coefficient.

5. A caching system for a multi-layer video network, wherein the multi-layer video network comprises at least one parent node and multiple child nodes connected to the parent node, comprising:
  a computer processor configured to:
    collect a user request arrival rate of each child node with respect to each content in a content set;
    determine an optimal storage policy and an optimal upload bandwidth allocation policy of each child node with respect to each content based on the user request arrival rate, storage capacity and upload bandwidth of each child node, and a size of each content;
    calculate a current storage policy of each child node with respect to each content by using the user request arrival rate in each child node, the storage capacity, the size of each content, and an iteration coefficient with respect to each content, and send the current storage policy to the parent node;
    calculate a current total content demand according to the current storage policy of the multiple child nodes, the user request arrival rate, the size of each content, and transfer the current total content demand to each child node;
    calculate an upload bandwidth allocation policy according to the current total content demand and the upload bandwidth of each child node;
    transfer the upload bandwidth allocation policy to the parent node;
    update the iteration coefficient according to the upload bandwidth allocation policy, the upload bandwidth, and the current total content demand;
    return the updated iteration coefficient to the current storage policy obtaining unit until the current storage policy obtaining unit determines that the current storage policy and the upload bandwidth allocation policy converge at the optimal storage policy and the optimal upload bandwidth allocation policy; and
    define the current storage policy as follows in each child node:

$$X_{ij}^k(t) = \begin{cases} 1, & \text{for } k \in [1, z); \\ 0, & \text{for } k \in [z, |K|], \end{cases}$$

wherein $X_{ij}^k(t)$ is the current storage policy,
  wherein $z=\min\{h:\Sigma_{k=1}^h s_k > B_{ij}\}$,
  wherein K is a content set,
  wherein k is each content in the content set K,
  wherein $s_k$ is a size of each content k,
  wherein $B_{ij}$ is storage capacity,
  wherein i and j are non-zero positive integers,
  wherein h is a positive number,
  wherein when $X_{ij}^k(t)=1$, the content k is stored,
  wherein when $X_{ij}^k(t)=0$, the content k is not stored, and
  wherein t is the number of iterations of the iteration coefficient.

6. A caching system for a multi-layer video network, wherein the multi-layer video network comprises at least one parent node and multiple child nodes connected to the parent node, comprising:
  a computer processor configured to:
    collect a user request arrival rate of each child node with respect to each content in a content set;
    determine an optimal storage policy and an optimal upload bandwidth allocation policy of each child node with respect to each content based on the user request arrival rate, storage capacity and upload bandwidth of each child node, and a size of each content;
    calculate a current storage policy of each child node with respect to each content by using the user request arrival rate in each child node, the storage capacity, the size of each content, and an iteration coefficient with respect to each content, and send the current storage policy to the parent node;
    calculate a current total content demand according to the current storage policy of the multiple child nodes, the user request arrival rate, and the size of each content, and transfer the current total content demand to each child node;
    calculate an upload bandwidth allocation policy according to the current total content demand and the upload bandwidth of each child node;
    transfer the upload bandwidth allocation policy to the parent node;
    update the iteration coefficient according to the upload bandwidth allocation policy, the upload bandwidth, and the current total content demand;
    return the updated iteration coefficient to the current storage policy obtaining unit until the current storage policy obtaining unit determines that the current storage policy and the upload bandwidth allocation policy converge at the optimal storage policy and the optimal upload bandwidth allocation policy; and
    obtain the current total content demand according to the following equation:

$$Q_k(t) = \sum_{j\in J} \lambda_{ij}^k s_k (1 - X_{ij}^k(t)),$$

wherein $Q_k(t)$ is the current total content demand,
  wherein $X_{ij}^k(t)$ is the current storage policy, wherein $\lambda_{ij}^k$ is the user request arrival rate,
wherein K is a content set,
wherein k is each content in the content set K,
wherein $s_k$ is a size of each content k,
wherein i, j, and J are non-zero positive integers, and
wherein t is the number of iterations of the iteration coefficient.

7. A caching system for a multi-layer video network, wherein the multi-layer video network comprises at least one parent node and multiple child nodes connected to the parent node, comprising:
a computer processor configured to:
collect a user request arrival rate of each child node with respect to each content in a content set;
determine an optimal storage policy and an optimal upload bandwidth allocation policy of each child node with respect to each content based on the user request arrival rate, storage capacity and upload bandwidth of each child node, and a size of each content;
calculate a current storage policy of each child node with respect to each content by using the user request arrival rate in each child node, the storage capacity, the size of each content, and an iteration coefficient with respect to each content, and send the current storage policy to the parent node;
calculate a current total content demand according to the current storage policy of the multiple child nodes, the user request arrival rate, and the size of each content, and transfer the current total content demand to each child node;
calculate an upload bandwidth allocation policy according to the current total content demand and the upload bandwidth of each child node;
transfer the upload bandwidth allocation policy to the parent node;
update the iteration coefficient according to the upload bandwidth allocation policy, the upload bandwidth, and the current total content demand;
return the updated iteration coefficient to the current storage policy obtaining unit until the current storage policy obtaining unit determines that the current storage policy and the upload bandwidth allocation policy converge at the optimal storage policy and the optimal upload bandwidth allocation poilcy; and
calculate the upload bandwidth allocation policy according to the following equation:

$$q_{ij}^k(t) = \begin{cases} \dfrac{Q_k(t)}{U_{ji}} & k \in [1, z) \text{ and } X_{ij}^k(t) = 1; \\ \dfrac{U_{ji} - \sum_{k=1}^{z-1} Q_k(t)}{U_{ji}} & k = z; \\ 0 & k \in (z, |K|] \text{ or } X_{ij}^k(t) = 0, \end{cases}$$

wherein $q_{ij}^k(t)$ is the upload bandwidth allocation policy,
wherein $Q_k(t)$ is the current total content demand,
wherein $X_{ij}^k(t)$ is the current storage policy,
wherein $\lambda_{ij}^k$ is the user request arrival rate,
wherein $U_{ji}$ is the upload bandwidth of each child node,
wherein z=min{h:$\Sigma_{k=1}^h s_k > B_{ij}$},
wherein K is a content set,
wherein k is each content in the content set K,
Wherein $s_k$ is a size of each content k,
wherein $B_{ij}$ is the storage capacity of each child node,
wherein i and j are non-zero positive integers,
wherein h is a positive integer, and
wherein t is the number of iterations of the iteration coefficient.

8. A caching system for a multi-layer video network, wherein the multi-layer video network comprises at least one parent node and multiple child nodes connected to the parent node, comprising:
a computer processor configured to:
collect a user request arrival rate of each child node with respect to each content in a content set;
determine an optimal storage policy and an optimal upload bandwidth allocation policy of each child node with respect to each content based on the user request arrival rate, storage capacity and upload bandwidth of each child node, and a size of each content;
calculate a current storage policy of each child node with respect to each content by using the user request arrival rate in each child node, the storage capacity, the size of each content, and an iteration coefficient with respect to each content, and send the current storage policy to the parent node;
calculate a current total content demand according to the current storage policy of the multiple child nodes, the use request arrival rate, and the size of each content, and transfer the current total content demand to each child node;
calculate an upload bandwidth allocation policy according to the current total content demand and the upload bandwidth of each child node;
transfer the upload bandwidth allocation policy to the parent node;
update the iteration coefficient according to the upload bandwidth allocation policy, the upload bandwidth, and the current total content demand;
return the updated iteration coefficient to the current storage policy obtaining unit until the current storage policy obtaining unit determines that the current storage policy and the upload bandwidth allocation policy converge at the optimal storage policy and the optimal upload bandwidth allocation policy; and
update the iteration coefficient according to the following equation:

$$\eta_{ij}^k(t+1) = \eta_{ij}^k(t) + \theta(t)\left(\sum_{j\in J} q_{ij}^k(t)U_{ji} - Q_k(t)\right) * f\left(\sum_{k\in K} q_{ij}^k(t)\right),$$

wherein $\eta_{ij}^k(t=1)$ is the iteration coefficient after the updating,
wherein $\eta_{ij}^k(t)$ is the iteration coefficient before the updating,
wherein $U_{ji}$ is the upload bandwidth of each child node,
wherein $Q_k(t)$ is the current total content demand,
wherein $X_{ij}^k(t)$ is the current storage policy,
wherein $\lambda_{ij}^k$ is the user request arrival rate,
wherein K is a content set,
wherein k is each content n the content set K,
wherein $s_k$ is a size of each content k,
wherein i and j are non-zero positive integers,
wherein a function $$f\left(\sum_{k\in K} q_{ij}^k(t)\right)$$

is a function positively related to $(1-\Sigma_{k\in K}q_{ij}^k(t))$,
wherein $\theta(t)=1/t$ is a step length in an iteration process, and
wherein t is the number of iterations of the iteration coefficient.

* * * * *